United States Patent Office 3,600,427
Patented Aug. 17, 1971

3,600,427
PHENYL CARBAMATE LATENTIATED PHENETHYLAMINES
Anthony J. Verbiscar, 1616 E. Montecito Ave., Sierra Madre, Calif. 91024
No Drawing. Continuation-in-part of application Ser. No. 338,289, Jan. 17, 1964. This application May 8, 1967, Ser. No. 636,650
Int. Cl. C07c *125/04*
U.S. Cl. 260—471
17 Claims

ABSTRACT OF THE DISCLOSURE

Method of providing a physiologically active amine at a site within the body of a mammal where the amine exerts activity on the central nervous system or cerebral cortex which comprises administering an aromatic carbamate of said amine to a mammal at a dosage level stoichiometrically equal to dosage level of the physioliogically active amine, whereby said carbamate is absorbed and hydrolyzed in the body, releasing the physiologically active amine. A carbamate of a physiologically active amine wherein the ester moiety is an aromatic radical of the benzene and pyridine series which may be substituted with carbalkoxy, cyano, nitro, carbamoyl, sulfamoyl, acyl and halogen radicals and wherein the nitrogen atom of the carbamic acid moiety is a nitrogen atom of a non-tertiary amino radical of the physiologically active amine penetrates the blood-brain barrier and then release the amine.

CROSS-REFERENCE TO RELATED APPLICATION

This application is a continuation-in-part of my copending application Ser. No. 338,289, filed Jan. 17, 1964, now abandoned.

BRIEF SUMMARY OF INVENTION

This invention relates to a method whereby physiologically active amines can be made available at the proper sites in mammals for biological activity. More particularly, this invention relates to a method of drug latentiation whereby physiologically active amines are chemically modified to produce new compounds which in vivo liberate the parent physiologically active amine at proper site in mammals. More specifically, this invention relates to a method of modifying physiologically active amines into carbamates whereby it is possible to control the selective absorption, penetration rate or release of the physiologically active amine and prolongation of drug action at preselected sites in mammals.

The invention has two aspects. The first is that of providing an appropriate quantity of a physiologically active amine in carbamate ester form at an appropriate site of activity within the body for which the amine was designed. The second aspect is concerned with the release of the physiologically active amine within the body by biological hydrolysis of the carbamate ester.

There have been many attempts made to discover physiochemical properties of molecules which determine their rate of absorption in biological systems. Various explanations have been evolved, based upon electrical charge, molecular size, protein binding, dissociation constant at the pH of blood, osmosis, special tissue affinity, metabolic activity, lipoid solubility and combinations of these characteristics. Of these numerous and complex considerations, the most important one affecting the rate of absorption and tissue permeability of physiologically active amines in general is considered to be lipoid solubility. Lipoid solubility of a physiologically active amine can be increased and selectively varied by decreasing the polar character of the amine function by converting it into a carbamate ester, thereby altering its permeability in tissues.

I have discovered that physiologically active amines can be converted to the corresponding carbamate esters and that the alcoholic portion of the carbamate moiety can be varied to affect lipoid solubility. Furthermore, by this procedure, the specificity of certain physiologically active amines for different tissues can be varied and it is possible to vary the physiologically active amine so that it may be preferentially absorbed in one tissue while excluded from another. By means of this invention it is possible to provide derivatives of physiologically active amines with varying absorption characteristics for different biological organs and systems.

It is also possible by this invention to provide carbamates of physiolosically active esters wherein the alcoholic moiety of the carbamate ester is biologically hydrolyzed at the site of activity to release the physiologically amine within the body. In vivo hydrolysis of the carbamate function results in the formation of the corresponding carbamic acid which is chemically unstable in the body and decomposes to the parent physiologically active amine and carbon dioxide. It has been found that by controlling the structure of the alcoholic portion of the carbamate ester, a regulated rate of biological hydrolysis can be obtained and the desired physiologically active amine can be provided at proper site of activity over an extended and more useful period of time than heretobefore possible due to a regulated rate of biological hydrolysis following selective absorption. The site and rates of absorption and the rate of biological hydrolysis are controlled by factors inherent in the alcohol moiety of the carbamate.

The carbamates of this invention are readily synthesized from a physiologically active primary or secondary amine and an appropriate ester of chloroformic acid. The latter are easily prepared from corresponding hydroxy compounds by the well known reaction with phosgene. Thus, the potential of the invention can be extended by use of various chloroformic acid esters which impart specific absorption and hydrolysis characteristics to the resulting carbamate formed by reaction with the physiologically active amine.

DETAILED DESCRIPTION OF THE INVENTION

The present invention pertains to biologically active amines such as ephedrine, amphetamine, phenethylamine, α-methyl-m-tyramine, α - methyl-3,4-dihydroxyphenethylamine, metaraminol, isoproterenol, mescaline, mephentermine, methoxyphenamine, homarylamine, propylhexedrine, azacyclonol, coniine, zoxazolamine, phenmetrazine, phenothiazine, procaine, thiocaine, nornicotine, norcodeine, normorphine, cycloserine, α,α-dimethylphenethylamine, tolazoline, mecamylamine, anileridine, sulfanilamide, phenylephrine, desoxyephedrine, pseudoephedrine, phenylpropanolamine, 3,4 - dihydroxyphenylaminopropanol, p-hydroxyphenylmethylaminoethanol, m-hydroxyphenylethylaminoethanol, m - hydroxyphenylethanolamine and 2-aminoheptane, and particularly to the centrally active indogenous amines, including tryptamine, serotonin, epinephrine, norepinephrine, 5-methoxytryptamine, the tryamines, histamines, 3,4-dihydroxyphenethylamine and octopamine. Most of these amines exert their effects primarily on the cardiovascular and central nervous systems. The concentrations of some of the endogenous amines in the biological systems can sometimes be increased by administration of the amino acid analogs which are the natural precursors of these amines. Variations in concentration can also be brought about by using drugs which interfere with metabolic formation and degradation of the physiologically active amines. Enzyme systems such as hydroxylases, decarboxylases, monoamine oxidases and o-methylases can be affected to change biogenic amine concentrations. Most frequently these changes are not specific for a single amine when drugs interfering with the enzyme systems are used and the physiological effects are a composite of the change in concentration of several amines. The biogenic amines themselves and physiologically active amines in general pass into the central nervous system only to a limited extent or not at all. The passage of physiologically active amines of both endogenous and synthetic nature across the highly selective blood-brain barrier is extremely useful in treating diseases relating to brain disfunction.

The invention described herein provides methods and materials for increasing the concentration of a specific amine in a biological system, the brain being an example, in order to obtain a differentiated physiological effect. Accordingly, it is an object of this invention to provide a method for latentiation of physiologically active amines. It is a further object to provide a method for supplying a physiologically active amine to specific sites of activity within the body of a mammal so that the physiologically active amine is selectively absorbed and released at its site of activity. It is a further object of this invention to provide carbamates of physiologically active amines which control the absorption, penetration, period of activity and rate of release of a physiologically active amine at a particular site in the body of a mammal. A further object of this invention is to provide carbamates of physiologically active amines which have desirable physiological properties relating to penetration, absorption and release of the physiologically active amine within the body of a mammal. An additional object is to provide methods for producing and using such carbamates of physiologically active amines. These and other objects of this invention are apparent from the disclosure and are achieved in accordance with the following disclosure.

The physiologically active amines can be any of the well known classes of amine medicinal agents such as the adrenergic amines, the tranquilizing amines, the antihistamines, the muscle relaxant amines, the anesthetic amines, the vasoconstrictor amines, and the central nervous stimulant amines. Such amines are primary or secondary amines and contain at least one hydrogen atom attached to a basic amino nitrogen atom. They have $pK_a$ values in the range from 7 to 10, preferably from 7.5 to 8.5. The $pK_a$ value is $-\log K_a$ where $K_a$ is the basic dissociation constant for the amine.

In order to solubilize such amines in body fluids so that they can be absorbed by tissues, such as passing through the blood-brain barrier, for example, I have found that the amines can be converted to carbamates of a specific type which are hydrolyzable in body tissues to release the free amines at the site where they are effective. The carbamate moiety must have a specific structure in order to provide compounds which are soluble in body fluids and also readily hydrolyzable to release the amines.

The carbamates which comprise this invention can be illustrated by the following general formula $$R-N(X)-CO-Y-R'$$

wherein R represents the rest of a physiologically active amine of the type described herein minus the amino group, R' represents a monovalent organic radical such as the phenyl radical, the pyridyl radical or substituted phenyl or pyridyl radicals such as methoxyphenyl and methoxycarbonylphenyl radicals, or a substituted alkyl radical such as an α-carbethoxyethyl radical, X is H or alkyl and Y is oxygen or sulfur. Carbamates of the foregoing type have the desirable properties of being soluble in lipoid materials, selectively absorbed by the central nervous system, biologically hydrolyzed by enzyme systems present in mammals to release the physiologically active amine and having the ability to penetrate the blood-brain barrier.

In a preferred embodiment of the invention, carbamates of the following general structural formula have been found useful as muscle relaxing and tranquilizing drugs in mammals.

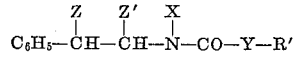

wherein Z represents a hydrogen atom or a hydroxyl radical, X and Z' represent a hydrogen atom or a lower alkyl radical, Y represents oxygen or sulfur, and R' represents phenly, pyridyl, halophenyl, alkoxyphenyl, acylphenyl, carbalkoxyphenyl, dithiocarbalkoxyphenyl, cyanophenyl, nitrophenl, carbamoylphenyl, sulfamoylphenyl or carbalkoxyalkyl radicals, wherein the alkyl, alkylene and acyl radicals contain 1 to 4 carbon atoms, inclusive. It has been found that carbamates of the foregoing formula are particularly desirable when R' represents a substituted phenyl radical of the following type

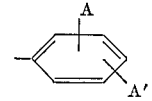

wherein A and A' represent the same or different substituent selected from dioxolanone, —CH=CHCOO—alkyl, hydrogen, nitro, alkoxyl, acyl, halogen, carbalkoxyl, dithiocarbalkoxyl, cyano, carbamoyl, N-alkylcarbamoyl, sulamoyl, N-alkylsulfamoyl, and carbalkoxyalkyl, wherein the alkyl, alkylene and acyl radicals contain 1 to 4 carbon atoms, inclusive.

These compounds reduce body tension and result in lowered physical activity in mammals such as mice, for example. In doses up to 50 milligrams/kilogram administered intraperitoneally to mice the compounds showed muscular relaxant and tranquilizing properties. At lower doses, certain of the compounds showed central nervous system stimulating properties which were often masked by muscle relaxation. The fact that the compounds exhibit muscle relaxant properties indicates that they have penetrated to the central nervous system of the test animals. The stimulation of the central nervous system at low concentrations is evidence for biological hydrolysis with subsequent release of the amines. A number of these compounds produce analgesia, which is also good evidence of central nervous system penetration. Investigations have revealed that electron-withdrawing substituents, such as the carbalkoxy substituents, on an aromatic ring constituting the R' group increase biological hydrolytic instability of the carbamates. Electron-withdrawing substituents in the aromatic radical appear to facilitate hydrolysis as evidenced by central nervous system stimulation. Other electron-withdrawing substituents, such as those illustrated in the radicals above, in the aromatic nuclei aid in the biological hydrolysis of the carbamate. The aromatic ester-forming groups add greater lipoid solubility to the compounds.

Carbamates of the foregoing type are produced by reacting an alcoholic substance of the formula R'OH or R'SH with phosgene to produce a chloroformic ester of the formula $$Cl-CO-Y-R'$$

This chloroformic ester reacts rapidly and readily with primary and secondary amines to produce carbamates, according to the equation

The amines of the formula $C_6H_5$—CHZ—CHZ'—NXH are physiologically active as central nervous stimulants and this property is exhibited by the carbamates upon administration to mammals followed by biological hydrolysis of the carbamates to release the physiologically active amines. Continued administration of the carbamates at low dosage levels enhances this activity.

A preferred group of biologically active amines have the following general formula

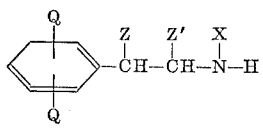

wherein either or both of the substituents represented by Q can be hydrogen, hydroxyl, alkoxyl, carboalkoxyl or alkyl, wherein the number of carbon atoms in the organic substituents is from 1 to 4, inclusive, or wherein the Q substituents together can represent a dioxolanone or carbonyldioxy radical; and wherein Z, Z' and X have the meanings given hereinabove.

The invention is described in more detail by means of the following examples which are provided for purposes of illustration only. It will be understood by those ksilled in the art that various modifications in reagents, operating conditions and the like may be made within the scope of the invention as disclosed herein.

EXAMPLE 1

Phenyl carbamate from L-ephedrine

A mixture of 6.6 g. of L-ephedrine in 40 ml. of chloroform and 2.33 g. of sodium carbonate in 12 ml. of water was cooled to 10° C. with an ice bath. The mixture was stirred well and a solution of 6.66 g. of phenyl chloroformate in 10 ml. of chloroform was added over 10 minutes keeping the temperature below 20° C. The bath was removed and stirring was continued for 1 hour, after which time carbo ndioxide stopped coming off. The layers were separated and the chloroform layer was washed successively with 20 ml. of 5% hydrochloric acid and 20 ml. of water. The chloroform solution was dried over sodium sulfate and then concentrated to yield an oil. The oil was crystallized from 30% carbon tetrachloride in n-hexane to give 6.7 g. of the phenyl carbamate from L-ephedrine as white needles, M.P. 69°–71° C. This compound has the formula

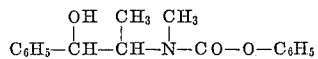

EXAMPLE 2 p-Methoxyphenyl carbamate from L-ephedrine p-Methoxyphenyl carbamate from L-ephedrine was prepared by the method of Example 1 with an equivalent quantity of p-methoxyphenyl chloroformate in lieu of the phenyl chloroformate. It was a colorless oil of the correct elemental analysis. It has the formula

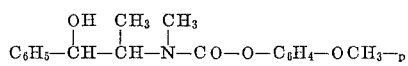

EXAMPLE 3

Phenyl α-methyl-β-phenylethylcarbamate

Phenyl α-methyl-β-phenylethylcarbamate was prepared by the method of Example 1 with an equivalent quantity of DL-amphetamine in lieu of the L-ephedrine. It has a melting point of 66°–67° C. and its infrared absorption spectrum in mineral oil has a peak at 5.75 microns. It has the formula

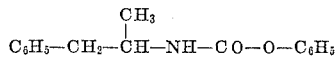

EXAMPLE 4 p-Methoxyphenyl α-methyl-β-phenylethylcarbamate p-Methoxyphenyl α-methyl-β-phenylethylcarbamate was produced by the procedure of Example 1 using an equivalent quantity of p-methoxyphenyl chloroformate in lieu of the phenyl chloroformate and an equivalent quantity of DL-amphetamine in lieu of the L-ephedrine. It melted at 87°–88° C. It has the formula

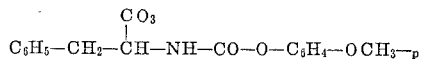

EXAMPLE 5 o-Carbomethoxyphenyl carbamate from L-ephedrine

A mixture of 4.95 g. of L-ephedrine, 1.7 g. of sodium carbonate, 20 ml. of water and 50 ml. of chloroform was cooled to 5° C. A solution of 6.66 g. of o-carbomethoxyphenyl chloroformate in 20 ml. of chloroform was added over 10 minutes with good stirring keeping the temperature below 15° C. The cooling bath was removed and the reaction mixture was allowed to stir for 1.5 hour longer. The organic layer was separated, washed with 20 ml. of 5% hydrochloric acid and with 20 ml. of water, dried over sodium sulfate and the solvent evaporated. The solid which remained was taken up in 30 ml. of chloroform in 100 ml. of n-hexane, decolorized with charcoal and the solution refrigerated overnight. A 7.66 g. yield of pure product crystallized out and was collected, M.P. 95°–96° C. It has the formula

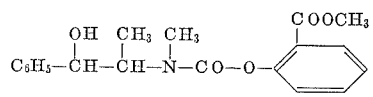

EXAMPLE 6 o-Carbomethoxyphenyl DL-α-methyl-β-phenylethyl-carbamate

A mixture of 5.53 g. of DL-amphetamine sulfate, 3.4 g. of sodium carbonate, 50 ml. of chloroform and 20 ml. of water was cooled to 5° C. The mixture was stirred well and a solution of 6.85 g. of o-carbomethoxyphenyl chloroformate in 20 ml. of chloroform was added over 10 minutes keeping the temperature below 15° C. The cooling bath was removed and the reaction mixture was stirred for 1.5 hour. The organic layer was separated and washed successively with 20 ml. of 5% hydrochloric acid and 20 ml. of water, dried over sodium sulfate, and the chloroform concentrated to give an oil. The oil was taken up in a 10% solution of chloroform in n-hexane, decolorized with charcoal, and the solution allowed to cool in the refrigerator. The 8.2 grams of clear, colorless oil which precipitated eventually crystallized to a M.P. 70°–80° C. The compound showed a single spot on thin layer chromatography and gave a correct elemental analysis for the o-carbomethoxyphenyl carbamate from DL-amphetamine. Its infrared absorption spectrum in carbon disulfide had peaks at 5.69 and 5.76 microns. It has the formula

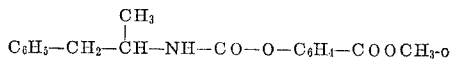

The o-carbomethoxyphenyl chloroformate was prepared as follows: To a well stirred solution of 13.5 g. of sodium methoxide in 200 ml. of dry methanol there was added over 15 minutes 38 g. of methyl salicylate, keeping the temperature below 5° C. After stirring the resulting heavy precipitate for an additional hour, 300 ml. of dry benzene were added and the solid was collected. Further work-up of the solvents eventually gave a total of 39.8 g. (92%) of pure white crystals of the sodium salt of methyl salicylate. It did not melt up to 300° C. but an infrared spectrum showed a strong peak at 5.95 microns, indicating an intact ester function ortho to an ionic phenolic group.

A flask with a stirrer, drying tube and thermometer was charged with 400 ml. of solvent A, consisting of 10% dry toluene in benzene, and 33 g. of phosgene while cooling in an ice-salt bath. The 39.8 g. of sodium methyl salicylate were added with stirring over 15 minutes keeping the temperature at −5° to 5° C., and then stirring at this temperature for an additional 2 hours. Filtration of the solid residue followed by distillation of the filtrate yielded 32 grams (65%) of o-carbomethoxyphenyl chloroformate as a clear, colorless oil, B.P. 106°–108° C. at 3 mm. An infrared spectrum showed no hydroxyl peak, but strong sharp peaks at 5.58 microns and 5.77 microns.

EXAMPLE 7

Carbamate from ethyl lactate and amphetamine

A mixture of 5.53 g. of DL-amphetamine sulfate, 3.4 g. of sodium carbonate, 50 ml. of chloroform and 20 ml. of water was cooled to 10° C. A solution of 5.8 g. of ethyllactyl chloroformate [α-carbethoxyethyl chloroformate] in 20 ml. of chloroform was added with good stirring over 10 minutes, keeping the temperature between 10°–15° C. After an hour the cooling bath was removed and the mixture was allowed to stir for 0.5 hours at room temperature, after which time carbon dioxide was no longer evolved. The organic layer was separated and washed successively with 20 ml. of 5% hydrochloric acid, 20 ml. of water, and dried over sodium sulfate. The solvent was evaporated leaving an oil which was taken up in 30 ml. of petroleum ether, decolorized with charcoal, filtered and the filtrate cooled in the refrigerator. The 6.8 g. of clear, colorless oil which precipitated gave a single spot on thin layer chromatography, showed infrared absorption peaks at 5.67 microns and 5.76 microns, and gave a correct elemental analysis for the ethyllactate carbamate of DL-amphetamine [α-carbethoxyethyl α-methyl-β-phenylethylcarbamate]. The product has the formula

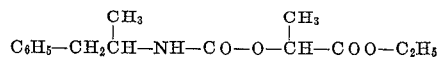

Ethyllactyl chloroformate [α-carbethoxyethyl chloroformate] was prepared as follows: A flask equipped with a stirrer, drying tube, thermometer, and dropping funnel was charged with 400 ml. of solvent A, consisting of 10% dry toluene in benzene, and 40 g. of phosgene while cooling in an ice-salt bath. A solution of 35.4 g. of ethyllactate and 36.4 g. of dimethylaniline in 100 ml. of solvent A was added with good stirring over 15 minutes keeping the temperature below 8° C. The solution was stirred in the ice-salt bath for one hour longer and then at room temperature for 1.5 hours, after which time a solid precipitated. A 100 ml. portion of water was added, the organic layer was separated and washed successively with 100 ml. of 5% hydrochloric acid and 100 ml. of water. After drying over calcium chloride, distillation yielded 36 g. (66%) of ethyllactyl chloroformate as a clear, colorless lachrymatory oil, B.P. 55°–57° C. at 4 mm. An infrared spectrum in carbon disulfide showed two strong sharp peaks at 5.58 microns and 5.66 microns.

EXAMPLE 8

Carbamate from ethyl lactate and ephedrine

This compound [α-carbethoxyethyl N-methyl-α-methyl-β-hydroxy-β-phenylethylcarbamate] was prepared by the procedure of Example 7, but with an equivalent quantity of L-ephedrine sulfate in lieu of the DL-amphetamine sulfate. It was a colorless oil which gave a single spot on thin layer chromatography. It has the formula

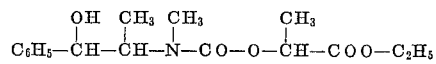

EXAMPLE 9 o-Nitrophenyl α-methyl-β-phenylethylcarbamate
(amphetamine o-nitrophenyl carbamate)

A flask was charged with 150 ml. of solvent A and 17 grams of phosgene were added while cooling at 0° C. in an ice-salt bath. A solution of 13.9 grams of o-nitrophenol in 30 ml. of solvent A was added all at once with no rise in temperature. An exothermic reaction occurred during the gradual addition of 10.1 grams of triethylamine in 30 ml. of solvent A with stirring as a white solid formed. After stirring at room temperature for an hour, 100 ml. of water was carefully added to dissolve all of the solids. The organic phase was separated and washed with water, dried over calcium chloride, and evaporated to a volume of about 50 ml. of yellow solution containing the o-nitrophenyl chloroformate. The carbamates were prepared from this solution, as disclosed below.

A mixture of 9.02 grams of DL-amphetamine sulfate, 5.30 grams of sodium carbonate, 70 ml. of water and 50 ml. of solvent A (or chloroform) was stirred and cooled to 0° C. The o-nitrophenyl chloroformate solution was added over 10 minutes with cooling, washing down with 20 ml. of solvent A. The mixture was stirred in the ice bath for 15 minutes and then at room temperature for two hours whereupon both layers became clear yellow and the pH 7 to 7.5. The organic phase was washed with 50 ml. of water, twice with 50-ml. portions of 5% hydrochloric acid and 50 ml. of water. After drying over sodium sulfate the solvent was evaporated to a small volume. With the gradual addition of 50 ml. of hexane to dissolve o-nitrophenol and excess chloroformate, a solid formed. This was collected and recrystallized from carbon tetrachloride giving 12.3 grams of crude product, M.P. 80°–86° C. Further recrystallization from dry isopropyl ether gave o - nitrophenyl α - methyl-β-phenylethylcarbamate crystals, M.P. 89°–90° C., which was homogeneous on thin layer chromatography. The compound is highly unstable in weak base, unstable in water and moderately unstable in hydroxylic solvents. This product has the formula

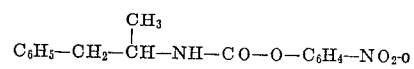

At doses of 10 to 50 mg./kg. administered intraperitoneally in rats and mice in propylene glycol, this compound produces initial tranquilization followed by marked, lasting stimulation of the amphetamine type. The tranquilizing effect is observed in rats at higher dosages while the delayed excitatory effect is evident at all dosage levels. The compound has marked adrenergic properties, producing mydriasis, piloerection, hyper-reactivity and, at dosages greater than 50 mg./kg., analgesia.

EXAMPLE 10 o-Nitrophenyl D-α-methyl-β-phenylethylcarbamate
(D-amphetamine o-nitrophenyl carbamate)

This compound was prepared in a manner identical to Example 9 using D-amphetamine sulfate instead of the racemate. Recrystallization from dry isopropyl ether gave long off-white needles, M.P. 92.5°–94° C., which were homogeneous on thin layer chromatography and gave a specific rotation $[\alpha]_D^{25°}$ of $-35°$ (chloroform, c.=1). The compound is extremely unstable in hydroxylic solvents and upon standing in ethanol overnight a sample was shown by thin layer chromatography to be completely hydrolyzed.

This compound at a dose of 100 mg./kg. administered intraperitoneally to rats and mice in propylene glycol gave moderate tranquilization and decreased motor activity lasting for 20 minutes, followed by increased motor activity and marked CNS stimulation.

EXAMPLE 11 m-Nitrophenyl D-α-methyl-β-phenylethylcarbamate
(D-amphetamine m-nitrophenyl carbamate)

This compound was prepared in a manner similar to Example 9 using m-nitrophenol and D-amphetamine sulfate instead of o-nitrophenyl and DL-amphetamine sulfate. Recrystallization of the product from benzene and isopropyl ether gave straw colored needles, M.P. 123°–124.5° C., which were homogeneous on thin layer chromatography and gave a specific rotation $[\alpha]_D^{25°}$ of $-8°$ (chloroform, c.=1). The compound is unstable in weak base but somewhat more stable in hydroxylic solvents than the o-nitrophenyl carbamates. It has the formula

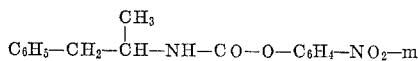

This compound had activity similar to that of Example 10.

EXAMPLE 12

Preparation of p-nitrophenyl chloroformate

A flask was charged with 350 ml. of solvent A and 100 grams of phosgene was added while cooling at 0° C. in an ice-salt bath. A solution of 83.5 grams of m-nitrophenol in 200 ml. of ethyl ether was added with no noticeable temperature change. Over the next 30 minutes a solution of 60.5 grams of triethylamine in 150 ml. of ethyl ether was added with good stirring while keeping the temperature below 20° C. After stirring for another hour and a quarter in the ice bath 100 ml. of water was cautiously added. The organic phase was separated, washed with water and dried over calcium chloride. The solvent was evaporated to a small volume, 70 ml. of dry benzene was added followed by 200 ml. of hexane and the crude crystalline product, M.P. 56°–63° C., was collected. Crystallization from 200 ml. of benzene gave 23 grams of p-nitrophenol starting material. The benzene supernate was evaporated and the residue was recrystallized from dry isopropyl ether, giving 44 grams of p-nitrophenyl chloroformate as white crystals, M.P. 67°–72° C.

EXAMPLE 12A p-Nitrophenyl D-α-methyl-β-phenylethylcarbamate (D-amphetamine p-nitrophenyl carbamate)

This compound was prepared essentially as in Example 9 using a 25% mole excess of p-nitrophenyl chloroformate and D-amphetamine sulfate. Recrystallization of the product from dry benzene and isopropyl ether gave long white needles, M.P. 124°–125° C., which are homogeneous on thin layer chromatography and gave a specific rotation $[\alpha]_D^{25°}$ of −21° (chloroform, c.=1). This compound had activity similar to that of Example 10.

EXAMPLE 13 o-Nitrophenyl carbamate of L-ephedrine

This compound was prepared essentially according to the method described in Example 9 using L-ephedrine hydrochloride in lieu of the amphetamine sulfate. It was isolated as a yellow oil from carbon tetrachloride and hexane, being homogeneous on thin layer chromatography. Its infrared absorption spectrum in chloroform with strong bands at 5.81 and 6.56 microns was consistent with structure. The compound is extremely unstable in weak base and hydroxylic solvents. It has the formula

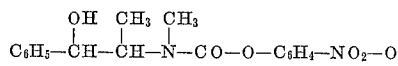

The activity spectrum of this compound is similar to that of o-nitrophenyl α-methyl-β-phenylethylcarbamate (Example 10) but is only one-third to one-half as potent.

EXAMPLE 14

Preparation of o-formylphenyl chloroformate

A flask was charged with 300 ml. of solvent A and 88 grams of phosgene were added while cooling at 0° C. in an ice-salt bath. A solution of 97.6 grams of freshly distilled salicylaldehyde in 50 ml. of solvent A was added all at once with no noticeable reaction. A solution of 96.7 grams of dimethylaniline and 8.1 grams of triethylamine in 50 ml. of solvent A was then added slowly with stirring and cooling as a solid formed. After stirring for six hours the mixture was allowed to stand overnight. The next day 150 ml. of water was added cautiously, the layers were separated, the organic phase was washed twice with 100-ml. portions of 5% hydrochloric acid and then dried over calcium chloride. The solvent was evaporated and the residue was crystallized from toluene-hexane giving 97.5 grams of white needles, M.P. 80°–81.5° C., which in air quickly became blue then pink. The product has the formula

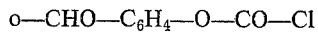

EXAMPLE 14A o-Formylphenyl α-methyl-β-phenylethylcarbamate (amphetamine salicylaldehyde carbamate)

This compound was prepared essentially by the method of Example 6, with an equivalent quantity of o-formylphenyl chloroformate in lieu of o-carbomethoxyphenyl chloroformate The product was recrystallized from chloroform-hexane as white crystals, M.P. 79°–81° C., which were homogeneous on thin layer chromatography. Its infrared absorption spectrum in chloroform has peaks at 5.75 and 5.92 microns. It has the formula

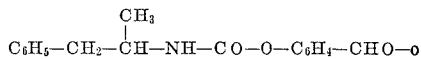

EXAMPLE 15 o-Formylphenyl carbamate of L-ephedrine

This compound was prepared essentially according to the methods of Examples 5 and 6 from o-formylphenyl chloroformate and L-ephedrine hydrochloride. The product was isolated as a colorless oil by solution in carbon tetrachloride and precipitation with hexane. Its infrared spectrum showed a skewed peak at 5.85 microns and it was homogeneous on thin layer choromatography. The compound is unstable in water and extremely unstable in weak base, giving a yellow colored solution due to free salicylaldehyde. It has the formula

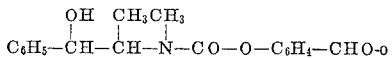

EXAMPLE 16

Bis(phenyl α-methyl-β-p-hydroxyphenylethylcarbamate) piperazine salt

[Bis(p-hydroxyamphetamine phenyl carbamate) piperazine salt]

A mixture of 6.96 g. of p-hydroxyamphetamine hydrobromide, 3.40 g. of sodium carbonate, 30 ml. of water and 60 ml. of chloroform was cooled in an ice bath and stirred well. A solution of 4.85 grams of phenyl chloroformate in 20 ml. of chloroform was added over five minutes as the temperature rose to 24° C. After stirring for two hours two clear layers separated. The chloroform phase was washed twice with 50-ml. portions of 5% hydrochloric acid and dried over sodium sulfate. Evaporation of the solvent left 8 g. of colorless oil. This was dissolved in 150 ml. of benzene and 4 g. of piperazine was added to the warm solution, followed by 80 ml. of hexane. The resulting precipitate was recrystallized from benzene to give 4.9 g. of white crystals, M.P. 115°–116° C., which were homogeneous on thin layer chromatography. An elemental analysis was correct for the bis compound. It has the formula

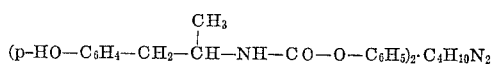

This compound produces central nervous stimulation at doses of 50–100 mg./kg. in rats and mice.

EXAMPLE 17 p-Nitrophenyl β-(3,4-dimethoxyphenyl)ethylcarbamate

A well stirred mixture of 10 g. of β-(3,4-dimethoxyphenyl)ethylamine, 4.0 g. of sodium carbonate, 40 ml. of water and 70 ml. of chloroform was cooled to 0° C. in an ice bath. A solution of 12 g. of p-nitrophenyl chloroformate in 70 ml. of chloroform was added over 15 minutes and the mixture was stirred for 1½ hours longer.

The organic phase was separated, washed with water, 5% hydrochloric acid, water again and then dried over sodium sulfate. The solvent was evaporated to a small volume and 100 ml. of ether was added to precipitate 16 grams of crude solid product. This was recrystallized from benzene-isopropyl ether to give white crystals with a yellow cast, M.P. 101°–103° C., which were homogeneous on thin layer chromatography. It has the formula

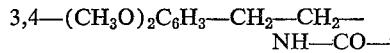
3,4—$(CH_3O)_2C_6H_3$—$CH_2$—$CH_2$—
$NH$—$CO$—$O$—$C_6H_4$—$NO_2$—p

This compound had activity similar to that of Example 10 but about one-third as potent.

EXAMPLE 18

Phenyl β-(3,4-dioxolanonephenyl)ethylcarbamate

A mixture of 2.0 g. of β-(3,4-dihydroxyphenyl)ethylamine hydrochloride, 0.7 g. of sodium carbonate, 20 ml. of water, 40 ml. of chloroform and 20 ml. of ethyl acetate was cooled to 0° C. A solution of 1.72 g. of phenyl chloroformate in 10 ml. of chloroform was added to the cooled mixture which was then stirred at room temperature for 4½ hours. The organic phase was separated, washed with 5% hydrochloric acid, 5% sodium bicarbonate solution, then with water and dried over sodium sulfate. To the dry filtered solution was added 2.22 g. of triethylamine followed by the dropwise addition of 2 g. of phosgene in 5 ml. of chloroform with cooling in the ice bath. After standing overnight in the refrigerator the solution was washed with water and dried over sodium sulfate. Evaporation of the solvent gave 2.3 g. of a crude solid product. This was crystallized from dry toluene to a tan crystalline powder, M.P. 103°–105° C., which was homogeneous on thin layer chromatography and gave the correct elemental analysis. It has the formula

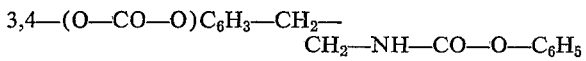
3,4—$(O$—$CO$—$O)C_6H_3$—$CH_2$—
$CH_2$—$NH$—$CO$—$O$—$C_6H_5$

This compound has activity similar to that of Example 19.

EXAMPLE 19 p-Nitrophenyl β-(3,4-dioxolanonephenyl)ethylcarbamate

This compound was prepared in essentially the same manner as in Example 18 using p-nitrophenyl chloroformate instead of phenyl chloroformate, and running the carbamoylation reaction for 1½ hours instead of 4½ hours. Carbonylation with phosgene and triethylamine gave a crude solid which was recrystallized from ethanol with considerable loss. The product appeared as tan crystals, M.P. 133°–135° C., which were homogeneous on thin layer chromatography and gave the correct elemental analysis. It is extremely unstable in weak base and hydroxylic solvents. It has the formula

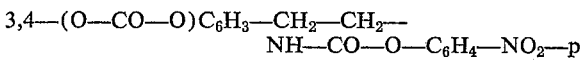
3,4—$(O$—$CO$—$O)C_6H_3$—$CH_2$—$CH_2$—
$NH$—$CO$—$O$—$C_6H_4$—$NO_2$—p This compound produced light to moderate tranquilization of rats with slight analgesia.

EXAMPLE 20

Phenyl β-(5-hydroxy-3-indolyl)ethylcarbamate 1,4-diazabicyclo[2.2.2]octane salt

A mixture of 105 mg. of 5-hydroxytryptamine hydrogen oxalate, 80 mg. of sodium carbonate, 80 mg. of phenyl chloroformate, 2 ml. of water and 5 ml. of ethyl acetate was shaken vigorously for one hour, whereupon the two layers became clear. There was added 3 ml. of water and 7 ml. of ethyl acetate and the organic phase was separated. It was washed with 5% hydrochloric acid followed by 5% sodium bicarbonate solution and dried over sodium sulfate. Forty-five milligrams of 1,4-diazabicyclo[2.2.2]octane (BDO) were added to the filtered solution and the solvent was evaporated. Recrystallization of the residue from dry benzene with an excess of DBO gave 110 mg. of fine white plates, M.P. 123°–125° C., which were homogeneous on thin layer chromatography. The compound has the formula

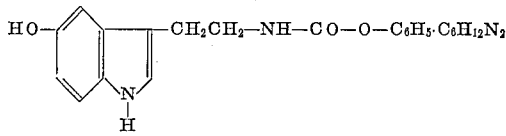
HO—$C_8H_5N$—$CH_2CH_2$—$NH$—$CO$—$O$—$C_6H_5$·$C_6H_{12}N_2$

At a dosage of 100 mg./kg. intraperitoneally in propylene glycol in rats, this compound produced light to moderate tranquilization.

EXAMPLE 21 o-Carbomethoxyphenyl β-(5-benzyloxy-3-indolyl)ethylcarbamate

A solution of 1.55 g. of o-carbomethoxyphenyl chloroformate in 50 ml. of chloroform was added to a suspension of 2.0 g. of 5-benzyloxytryptamine hydrochloride in 20 ml. of water containing 0.74 g. of sodium carbonate. The mixture was stirred at room temperature for 3.5 hours then at 50°–60° C. for 0.5 hour. After removal of 500 mg. of unreacted 5-benzyloxytryptamine hydrochloride the organic phase was separated, washed with 5% hydrochloric acid, then water and dried over sodium sulfate. Evaporation of the solvent left an oil. This was crystallized from carbon tetrachloride and then recrystallized from toluene to give 530 mg. of small white needles, M.P. 102.5°–103.5° C., which were homogeneous on thin layer chromatography. Its infrared spectrum in potassium bromide has peaks at 2.93 and 3.04 microns representing N—H absorption, and an askew peak at 5.81 microns corresponding to the two carbonyl functions. It has the formula

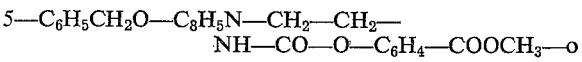
5—$C_6H_5CH_2O$—$C_8H_5N$—$CH_2$—$CH_2$—
$NH$—$CO$—$O$—$C_6H_4$—$COOCH_3$—o

EXAMPLE 22 o-Carbomethoxyphenyl β-(5-hydroxy-3-indolyl)ethylcarbamate

Method A.—A 200-mg. quantity of o-carbomethoxyphenyl β-(5-benzyloxy-3-indolyl)ethylcarbamate in 15 ml. of ethyl acetate was hydrogenated at atmospheric pressure for four hours using 200 mg. of 5% palladium on charcoal catalyst. The catalyst was removed and the solvent evaporated to give a semi-solid residue. Trituration with a small amount of isopropyl ether caused the residue to become more crystalline. A thin layer chromatogram on Merck silica gel G with a 9:1 benzene: ethanol developer showed the product to be homogeneous with an $R_f$ value of 0.21. An infrared spectrum in chloroform had peaks at 2.87 and 2.90 microns due to N—H absorption, an askew peak at 5.76 microns corresponding to the two carbonyl functions, and peaks at 6.13, 6.20, 6.29 and 6.73 microns due to the indolyl and aromatic rings. The compound has the formula

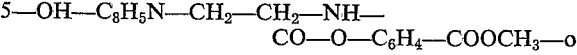
5—OH—$C_8H_5N$—$CH_2$—$CH_2$—$NH$—
$CO$—$O$—$C_6H_4$—$COOCH_3$—o

Method B.—A mixture of 100 mg. of serotonin hydrogen oxalate, 106 mg. of sodium carbonate, 140 mg. of o-carbomethoxyphenyl chloroformate, 2 ml. of water and 10 ml. of ethyl acetate was shaken vigorously for one hour and worked up in the usual manner. A solid product was isolated, M.P. 70°–80° C., which was only partially soluble in chloroform. Its infrared spectrum was comparable to the one above and its $R_f$ value on thin layer chromatography was identical.

EXAMPLE 23 p-Nitrophenyl β-(5-hydroxy-3-indolyl)ethylcarbamate

A mixture of 105 mg. of serotonin hydrogen oxalate, 80 mg. of sodium carbonate, 90 mg. of p-nitrophenyl chloroformate, 2 ml. of water and 5 ml. of ethyl acetate was shaken vigorously for 0.5 hour. The mixture was diluted with 3 ml. of water and 10 ml. of ethyl acetate and separated. The organic phase was washed successively with 5-ml. portions of water, 5% hydrochloric acid, then water and dried over sodium sulfate. A silver nitrate test was negative. Evaporation of the solvent gave an oil which was purified by dissolving in a few drops of ethyl acetate and precipitating with isopropyl ether to remove free p-nitrophenol. The resulting semi-solid was extremely labile toward hydroxylic solvents. On thin layer chromatography it has an $R_f$ value of 0.22–0.26 using Merck silica gel G and 8:2 benzene:ethyl acetate developer. It has the formula 5—HO—$C_8H_5N$—$CH_2$—$CH_2$—NH—CO—O—$C_6H_4$—$NO_2$—p

EXAMPLE 24 o-Nitrophenyl β-(5-hydroxy-3-indolyl)ethylcarbamate

A 110 mg. quantity of o-nitrophenol was converted to its chloroformate in the normal manner and added to a mixture of 105 mg. of serotonin hydrogen oxalate, 80 mg. of sodium carbonate, 2 ml. of water and 5 ml. of ethyl acetate. After shaking for 1.5 hours, the mixture was diluted with 3 ml. of water and 7 ml. of ethyl acetate and separated. The organic phase was washed with 5-ml. portions of water, 5% hydrochloric acid, then water and dried over sodium sulfate. A silver nitrate test for chloroformate was negative. Evaporation of the solvent gave a yellow oil which was taken up in 0.5 ml. of ethyl acetate and precipitated by the addition of 10 ml. of hexane. This purification was repeated to give a gummy product that was highly labile toward hydroxylic solvents. On thin layer chromatography it had an $R_f$ value of 0.29 using Merck silica gel G with a 9:1 benzene:ethanol developer. It has the formula 5—OH—$C_8H_5N$—$CH_2$—$CH_2$—NH—CO—O—$C_6H_4$—$NO_2$—o

EXAMPLE 25 o-Formylphenyl α-methyl-β-(p-hydroxyphenyl) ethylcarbamate

A solution of 2.15 g. of o-formylphenyl chloroformate in 60 ml. of ethyl acetate was added over 20 minutes to a stirred solution of 2.32 g. of α-methyl-β-(p-hydroxyphenyl)ethylamine hydrobromide and 1.15 g. of sodium carbonate in 20 ml. of water. After stirring at room temperature for 2.5 hours, the clear layers were separated. The organic phase was washed with 5% hydrochloric acid, then water and dried over sodium sulfate. Evaporation of the solvent left a yellow oil that was partially purified by dissolving in benzene and reprecipitating with hexane. The oil eventually solidified and was recrystallized to white, fluffy crystals, M.P. 113°–115° C., which were homogeneous on thin layer chromatography. An infrared spectrum in chloroform gave peaks at 2.91 microns due to N—H, 5.71 microns due to carbamoyl, 5.88 microns due to formyl and 6.21, 6.30 and 6.58 microns corresponding to the aromatic rings. It has the formula

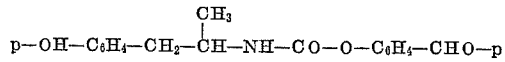

I claim:
1. A compound of the formula

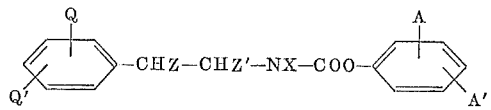

wherein

Q and Q′ are hydrogen, hydroxyl, lower alkoxyl, or carbonyldioxy,
Z is hydrogen or hydroxyl,
Z′ is hydrogen or lower alkyl,
X is hydrogen or lower alkyl,
A and A′ are hydrogen, lower alkoxyl, lower alkoxycarbonyl, nitro, or formyl and wherein the alkyl and alkoxyl radicals contain 1 to 4 carbon atoms.

2. A compound as defined in claim 1 wherein Q and Q′ are hydrogen.
3. A compound as defined in claim 2 wherein A and A′ are hydrogen.
4. A compound as defined in claim 3 wherein Z is hydrogen.
5. A compound as defined in claim 4 wherein Z′ is methyl.
6. A compound as defined in claim 5 wherein X is methyl.
7. A compound as defined in claim 3 wherein Z, Z′ and X are hydrogen.
8. A compound as defined in claim 3 wherein Z is hydroxyl.
9. A compound as defined in claim 8 wherein Z′ and X are methyl.
10. A compound as defined in claim 3 wherein Z′ is methyl.
11. A compound as defined by claim 1 wherein Q is hydroxyl and Q′ is hydrogen.
12. A compound as defined by claim 11 wherein Z, Z′, X and A are hydrogen and A′ is carbomethoxyl.
13. A compound as defined by claim 11 wherein A and A′ are hydrogen.
14. A compound as defined by claim 11 wherein Z, X and A are hydrogen, Z′ is methyl and A′ is formyl.
15. A compound as defined by claim 13 wherein Z, Z′ and X are hydrogen.
16 A compound as defined by claim 1 wherein Q and Q′ are hydrogen, A is hydrogen and A′ is methoxyl.
17. A compound as defined by claim 16 wherein Z, Z′ and X are hydrogen.

References Cited

UNITED STATES PATENTS 3,303,211    2/1967    Peterson et al. _____ 260—471

CHARLES B. PARKER, Primary Examiner

L. A. THAXTON, Assistant Examiner

U.S. Cl. X.R.

260—268, 294.8, 295, 326.14, 340.2, 455, 465, 470; 424—279, 310